(12) United States Patent
Wang et al.

(10) Patent No.: US 9,537,739 B1
(45) Date of Patent: Jan. 3, 2017

(54) HA SPLIT BRAIN OVER NETWORK

(71) Applicant: CA, Inc., Islandia, NY (US)

(72) Inventors: Xiaopin Wang, Beijing (CN); Haiyang Zhang, Beijing (CN); Shishen Liu, Beijing (CN); Guoxian Shang, Beijing (CN)

(73) Assignee: CA, Inc., New York, NY (US)

( * ) Notice: Subject to any disclaimer, the term of this patent is extended or adjusted under 35 U.S.C. 154(b) by 827 days.

(21) Appl. No.: 13/942,895

(22) Filed: Jul. 16, 2013

(51) Int. Cl.
 G06F 15/16 (2006.01)
 H04L 12/26 (2006.01)

(52) U.S. Cl.
 CPC .................. *H04L 43/08* (2013.01)

(58) Field of Classification Search
 None
 See application file for complete search history.

(56) References Cited

U.S. PATENT DOCUMENTS 8,060,776 B1 * 11/2011 Schoenthal ......... G06F 11/2069
 711/162
8,639,878 B1 * 1/2014 Chatterjee ........... G06F 11/1096
 711/114

* cited by examiner

*Primary Examiner* — Jeffrey R Swearingen
(74) *Attorney, Agent, or Firm* — Gilliam IP PLLC

(57) ABSTRACT

A method implemented by a node in a high availability system having a master node and a replica node, the method including monitoring another node to determine whether or not the node is responding via a network connection, when the node is found to be not responding, changing into a periodic replication mode of operation, serving user requests while in the replication mode of operation, determining that the other node is now responding via the network connection, negotiating to merge changes resulting from serving the user requests with the other node, and reverting to an online replication mode of operation.

15 Claims, 3 Drawing Sheets

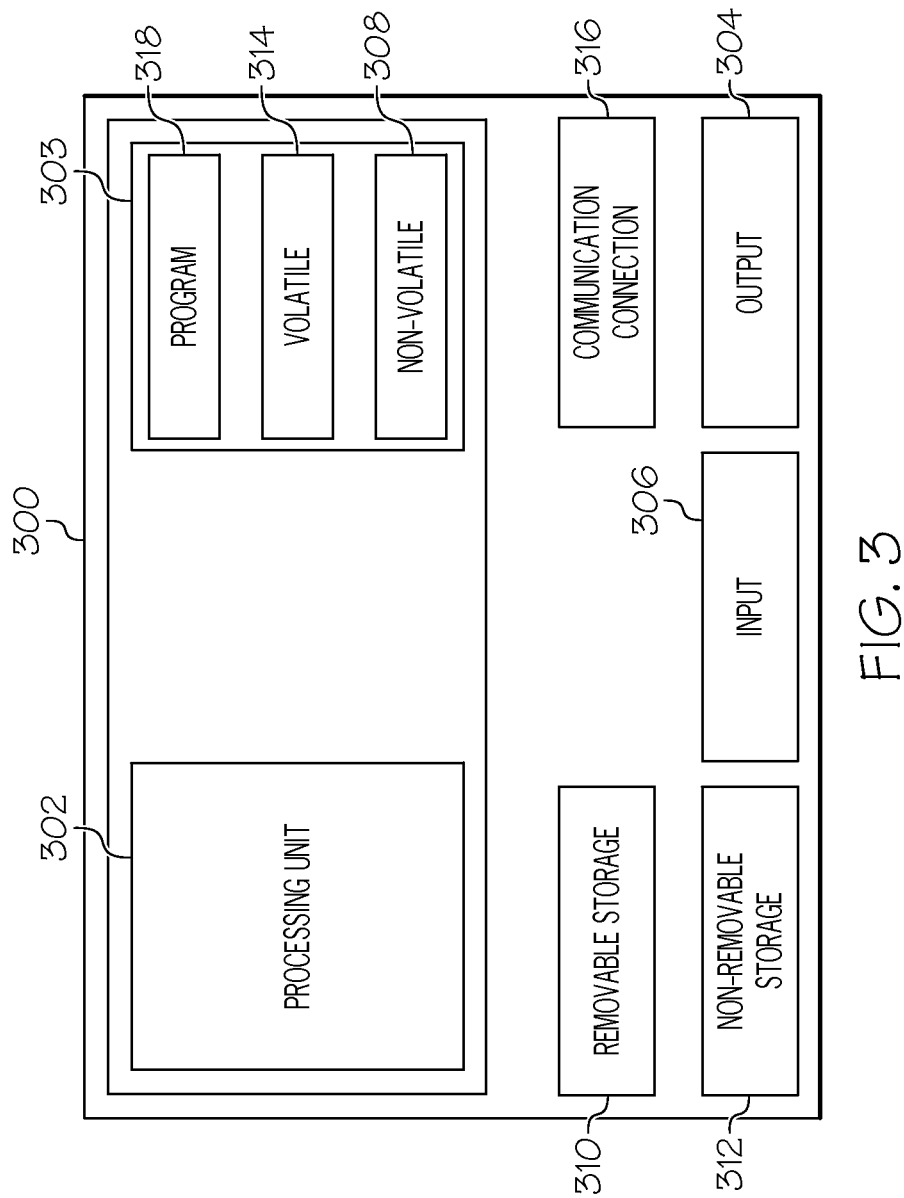

HA SPLIT BRAIN OVER NETWORK

BACKGROUND

Split brain data or availability inconsistencies originate from the maintenance of two separate data sets at different network nodes with overlap in scope, either because of servers in a network design, or a failure condition based on servers not communicating and synchronizing their data to each other. In a high availability (HA) split brain situations, if communications between the nodes is broken, each node may continue to run, and serve clients, oblivious to other nodes.

There is no trustworthy arbitrator than identify whether a node is down or not communicating. Usual approaches to correctly synchronizing data between the nodes may involve selecting between different solutions. In one solution, a most recent failed node will become the master. In another solution, the most frequently I/O updated node will become the master. In still a further solution, a graphical user interface prompts an administrator to select a node to become the master. In any case, some data on the new replica may be lost during the split brain period. In critical situations, such as finance protection, such losses are unacceptable.

BRIEF SUMMARY

According to one aspect of the present disclosure, A method implemented by a node in a high availability system having a master node and a replica node, the method including monitoring another node to determine whether or not the node is responding via a network connection, when the node is found to be not responding, changing into a periodic replication mode of operation, serving user requests while in the replication mode of operation, determining that the other node is now responding via the network connection, negotiating to merge changes resulting from serving the user requests with the other node, and reverting to an online replication mode of operation.

In a further embodiment, a system includes a master node having a copy of application data coupled to users of the application via a network connection, a replica node having a replicated copy of the application data, the replica node coupled to the master node and the users of the application via a network connection, and a change merge tool residing on both the master node and the replica node to control negotiations between the master node and replica node following a communication failure between the master node and replica node to determine which node will become a new master node when the communication failure is repaired.

A computer program product includes a computer readable storage medium having computer readable program code embodied therewith, the computer readable program code configured to cause a computer to perform a method including monitoring another node to determine whether or not the node is responding via a network connection, when the node is found to be not responding, changing into a periodic replication mode of operation, serving user requests while in the replication mode of operation, determining that the other node is now responding via the network connection, negotiating to merge changes resulting from serving the user requests with the other node, and reverting to an online replication mode of operation.

BRIEF DESCRIPTION OF THE DRAWINGS

Aspects of the present disclosure are illustrated by way of example and are not limited by the accompanying figures with like references indicating like elements.

FIG. 3 is a block diagram illustrating an example computer system for implementing nodes in a high availability system according to an example embodiment.

DETAILED DESCRIPTION

Figure 1:
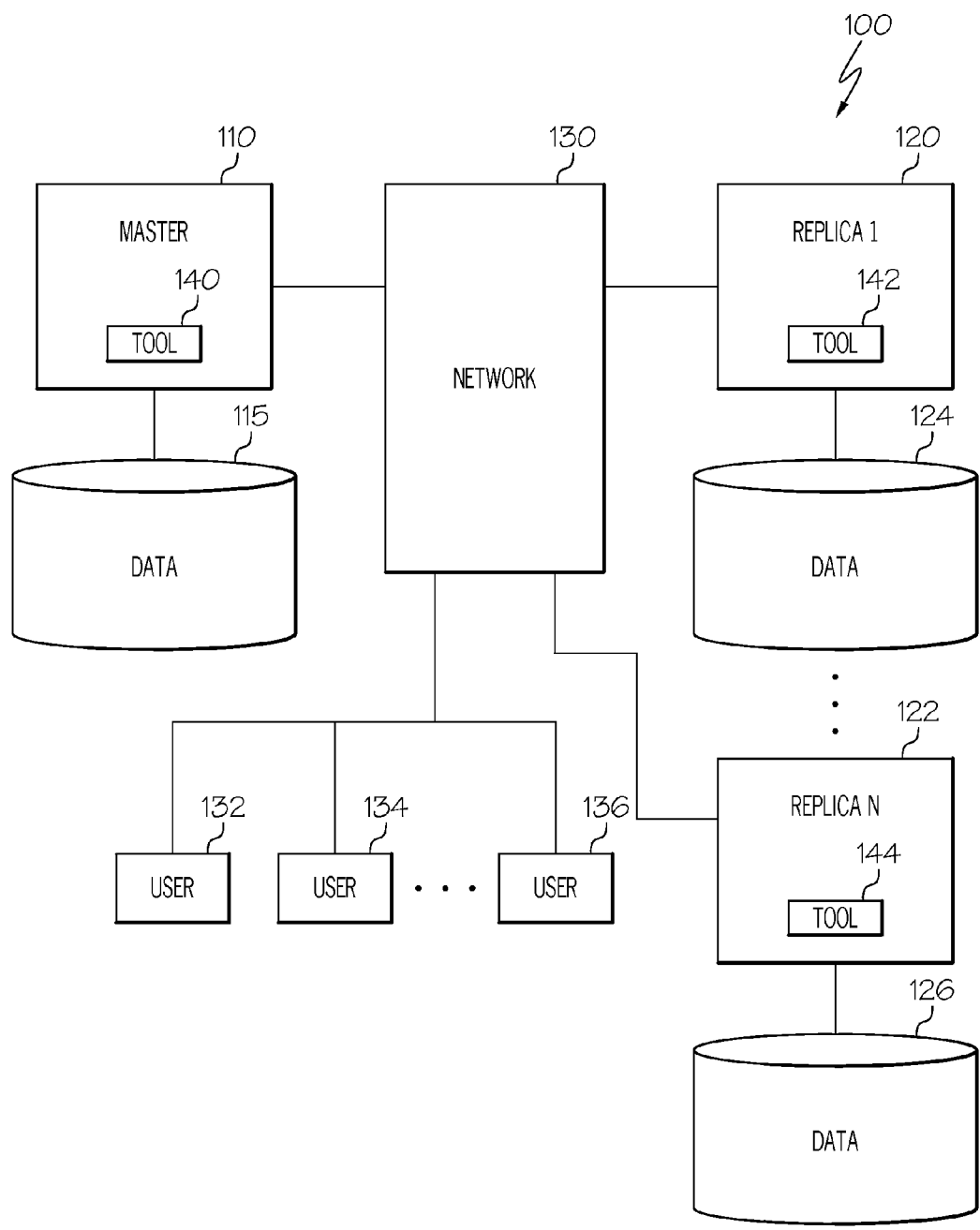
FIG. 1 is a block diagram of a high availability system having master and replica nodes according to an example embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wired, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

A system and method are used to resolve conflicts in stored data resulting from communication failures between nodes of a high availability network. It indicates data or availability inconsistencies originating from the maintenance of two separate data sets with overlap in scope, either because of servers in a network design, or a failure condition based on servers not communicating and synchronizing their data to each other. This last case is also commonly referred to as a network partition.

Typical usage of the jargon term is when internal and external Domain Name Services (DNS) for a corporate network are not communicating, so that separate DNS name spaces are to be administrated for external computers and for internal ones. This requires a double administration, and if there is domain overlap in the computer names, there is a risk that the same fully qualified domain name (FQDN), may ambiguously occur in both name spaces referring to different computer IP addresses.

High-availability clusters may use a heartbeat private network connection which is used to monitor the health and status of each node in the cluster. For example the split-brain syndrome may occur when all of the private links go down simultaneously, but the cluster nodes are still running, each one believing they are the only one running. The data set of each cluster then randomly may serve clients by their own "idiosyncratic" data set updates, without the coordination with the other data sets. A shared storage may experience data corruption. If the data storages are kept separate, most data can be synchronized via merge rules, but some data inconsistencies may utilize operator intervention and cleanup.

FIG. 1 is a block diagram of a high availability computer system 100. In one embodiment, the high availability computer system 100 may be an SAP HA product, which may use a server having data replicated on a replica server that can take over and provide services to users of one or more applications running on the server. System 100 in one embodiment has a master node 110 that includes a database 115. One or more replica nodes indicated at 120 and 122 also include databases 124, 126 respectively. The nodes are all coupled together by a network 130, which also receives communications from one or more users indicated at 132, 134, and 136. Each node in one embodiment receives requests from the users and either provide responses or direct the request to other nodes to handle. Data in the databases is replicated such that each node has the same set of data. In one embodiment, the master node 110 operates to manage the replication of data between nodes in real time when all nodes are known to be operating and communicating correctly.

In one embodiment, both the master and replica nodes monitor each other. When another node does not respond, hence is deemed not alive after a predefined period, both the master and replica turn into a periodic replication mode with the periodic interval as infinite, resulting in no journal updates being sent. The non-responsiveness or not alive determination may result from a network connection being faulty, to one of the nodes suffering a power outage or failure, or one of many other causes. The replica also keeps a snapshot after all received data from the master are applied and before becoming a separate master. This way, both the original master and replicas can store the changes for a long time since periodic replication mode only stores the data change range in a journal instead of the actual data. Note that during this period, both the master and replica may direct their local domain name server (DNS) or other device that directs network traffic to send traffic to them, since they may not be able to receive such traffic due to their not responding to an alive inquiry. Both nodes may thus operate as if the other does not exist, each modifying the data that is normally replicated between them. This phenomenon has been referred to as a split brain in computer science. The difficulty resides in bringing the "brains" back together once communications are restored, and making sure that both nodes have the same data.

In one example, the master resides in one country, such as the United States, and the replica resides in another country, such as China. The master updates the DNS in US to point to itself, while the replica also directs the DNS in China to point to the itself. Considering the newly updated DNS in China usually takes many hours to start synchronizing to the DNS in the US, there exists a period that China's users are re-directed to the replica while US's users are redirected to the master.

When the connection comes back, Master and Replica will negotiate to see who will become the new Master. This is achieved by both invoking a third party tool 140, 142, 144 which may be provided by the company that generated an application which is protected and executed by one or more nodes of the high availability system. The negotiation may follow a rule, for example, which rule could be the node with the biggest data changes. The third party tool 140, 142, 144 can make a judgment based on the data changes on both sides and also the snapshot from the replica. Note that the data changes can be read through firing up a new snapshot. Then the tool merges the changed data from the new replica to the new master with the help of the high availability system for data moving. In one embodiment, the system queries all transactions starting from the time that starts the split brain on the new replica and inserts them to the new master, such as for a finance application, where data integrity is desired. In a further embodiment, web pages from the new replica may be merged to the new Master when the application is a web server. Merge conflicts will be sent to the high availability system for forwarding warnings of the conflicts to users, such as administrators, for manual interactions. The whole merge process may repeat several times until the tool encounters almost no new updates from the new replica's application users. Then the new replica stops to provide application services and redirects the DNS to the new master if needed. Then the last newly updated data are merged to the new master. Then the master and replica turn back into online replication mode, where data changes are shared in real time.

Figure 2:
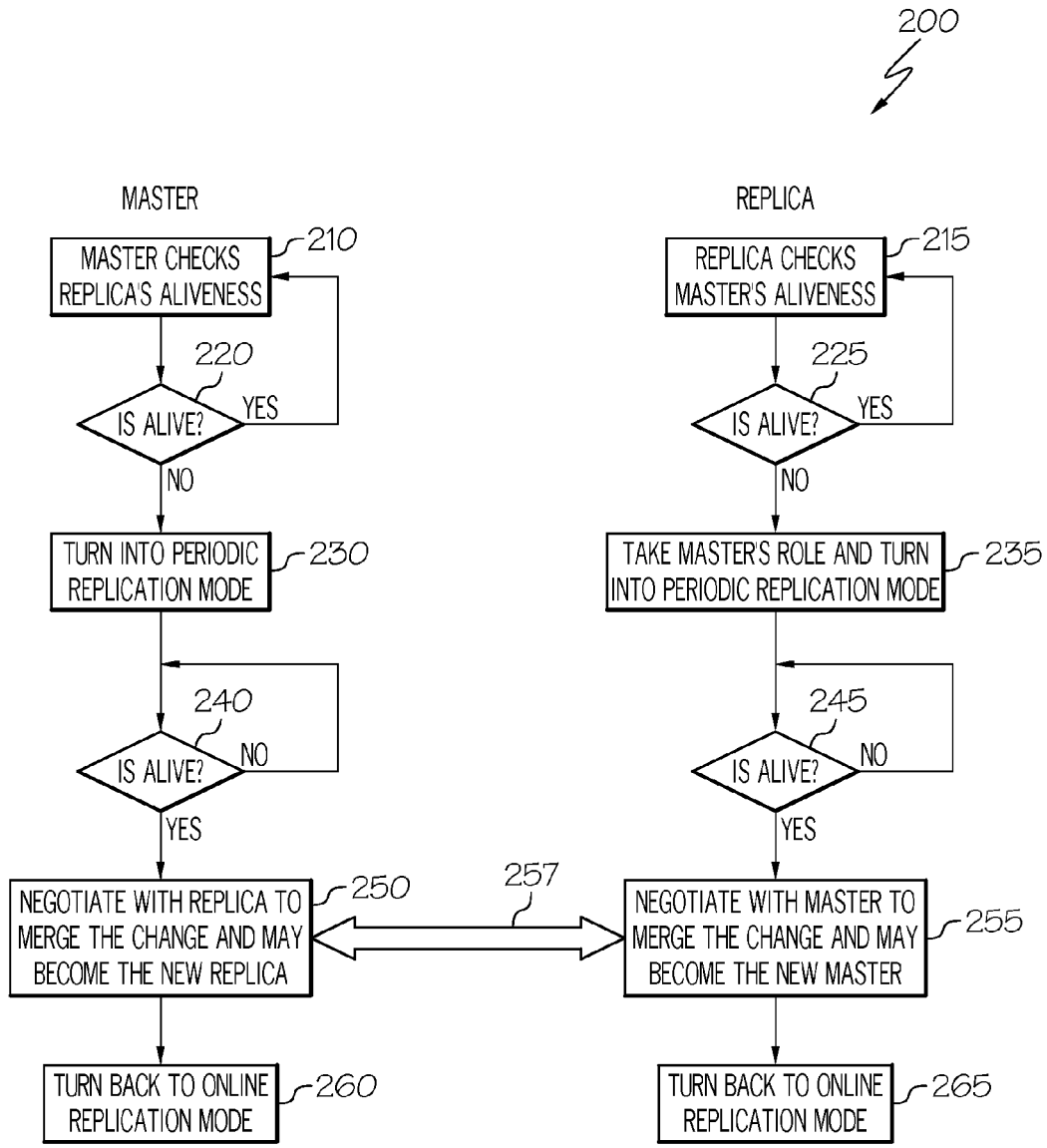
FIG. 2 is a flowchart illustrating a method of merging data following a loss of communications between nodes in a high availability system according to an example embodiment.

FIG. 2 is a flowchart illustrating a method 200 implemented by both a master and a slave node as described above and further described below. While only two nodes are shown, there may be many more replicas involved, and the method contemplates that one has been selected to operate as a new master when communication difficulties are encountered. The selected replica may be selected prior to communications difficulties, or may follow any one of a number of protocols, such as for example, the replica previously handling the most traffic or I/O updates, the one located nearest to the original master, or the one selected by a network administrator prompted via a graphical user interface.

The method 200 begins with a master node checking to see if a replica node is responding at 210. The replica node is also checking to see if the master node is responding at 215. The flowchart is shown with a column for performance of the method by each of the master and replica. The response to the check is processed at 220 and 225 respectively, with a positive response resulting in continued periodic check by the master and replica at 210 and 215 respectively.

As previously discussed, there may be many reasons why a response may not be received, such as network problems, malfunctions, maintenance downtime, etc. When no response is received, indicating that the node or nodes not responding are not alive at 220 and 225, the master turns into a periodic replication mode at 230, while the replica takes the master's role and also turns into a periodic replication mode at 235.

The periodic replication node may involve setting a periodic interval as infinite. In one embodiment, the replica also keeps a snapshot after all received data from the master are applied and before becoming a separate master at 235. This way, both the original master and replicas can store the changes for a long time since periodic replication mode only stores the data change range instead of the actual data.

At 240, and 245, monitoring of the life status of the previous replica node and previous master nodes are performed respectively. If neither has returned to life, the nodes maintain their current operating modes, where the prior replica has turned into a new master at 235. However, if monitoring of the status of the nodes indicates that a node has returned to life, and is now communicating correctly via a network connection at 240 or 245, negotiations occur at 250 and 255 as indicated by a connection line 257. The previous master negotiations with the previous replica to merge changes and to perhaps become a new replica. The previous replica negotiates with the previous master to merge the changes and may become the new master. At 260 and 265, the nodes return to online replication mode, and then continue to check whether the other node is alive at 210 and 215 respectively.

During the negotiations indicated at 250 and 255, the nodes may follow a merge process that may be defined by the application specific tools running on each node. The tools may define how conflicts are to be resolved, either via an algorithm or by kicking the conflict out to an administrator for resolution.

FIG. 3 is a block schematic diagram of a computer system 300 to implement one or more master and replica nodes of a high availability network according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 300, may include a processing unit 302, memory 303, removable storage 310, and non-removable storage 312. Memory 303 may include volatile memory 314 and non-volatile memory 308. Computer 300 may include—or have access to a computing environment that includes—a variety of computer-readable media, such as volatile memory 314 and non-volatile memory 308, removable storage 310 and non-removable storage 312. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 300 may include or have access to a computing environment that includes input 306, output 304, and a communication connection 316. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 302 of the computer 300. A hard drive, CD-ROM, and RAM are some examples of articles including a non-transitory computer-readable medium. For example, a computer program 318 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 300 to provide generic access controls in a COM based computer network system having multiple users and servers.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
    a first node and a second node monitoring one another via a network connection for responsiveness, wherein the first node operates as a master node and the second node operates as a replica node to the first node;
    when the second node is found to be not responsive by the first node and the first node is found to not be responsive by the second node,
        the first node changing into a periodic replication mode from an online replication mode, wherein the first node stores a data change range in a journal instead of changed data while in the periodic replication mode;
        the second node applying data already received from the first node, taking a snapshot after applying the received data, changing to operate as a master node after taking the snapshot, and changing into the periodic replication mode from the online replication mode, wherein the second node stores a data change range in a journal instead of changed data while in the periodic replication mode;
    the first and second nodes both serving received user requests while in the periodic replication mode;
    after the first and the second nodes determined that the other node is now responding via the network connection, the first and second nodes negotiating with each other to share and merge data changes resulting from serving the received user requests while in the periodic replication mode; and
    the first and second nodes reverting to the online replication mode after negotiating completes.

2. The method of claim 1 wherein a period of the periodic replication mode is set to infinite.

3. The method of claim 1 wherein negotiating with each other to share and merge data changes comprises:
    determining which node had the most data changes while in the periodic replication mode;
    selecting the node with the most data changes as a new master node and the node with fewer changes as a new replica node; and
    merging changes in data from the new replica node into the new master node.

4. The method of claim 3 wherein negotiating with each other to share and merge data changes further comprises querying changes made by the new replica node and inserting such changes into the new master node.

5. The method of claim 4 wherein negotiating with each other to share and merge data changes further comprises flagging conflicts in the merged data changes.

6. One or more non-transitory computer readable media having computer readable program code embodied therewith, the computer readable program code to:
    monitor a first node from a second node to determine whether or not the first node is responding via a network connection;
    when the first node is found to be not responding based on the monitoring and the first node is operating as a master node and the second node is operating as a replica node for the first node,
        apply data received from the first node while the first node was operating as the master node and prior to the first node being found not responsive, take a snapshot after applying the received data, change the second node to operate as a master node after taking the snapshot, and change the second node from an online replication mode to a periodic replication mode, wherein a node stores a data change range in a journal instead of storing changed data while in the periodic replication mode;
    serve user requests received while in the periodic replication mode;

based on a determination that the first node has become responsive via the network connection, negotiate with the first node to merge changes resulting from both the first and second nodes serving the user requests while in the periodic replication mode; and revert the second node to an online replication mode.

7. The computer readable media of claim 6 wherein the program code to change the second node to the periodic replication mode comprises program code to set a period of the periodic replication mode to infinite.

8. The computer readable media of claim 6 wherein the program code to negotiate to merge changes comprises the program code to:
- determine which node had the most changes while the first node was not responsive to the second node and both the first and the second nodes were serving user requests;
- select the second node as a new master node based on a determination that the second node had the most changes;
- select the second node as a new replica node based on a determination that the second node had fewer changes; and
- merge changes in data from the new replica node into the new master node.

9. The computer readable media of claim 8 wherein the program code to negotiate to merge changes further comprises program code to query changes made by the new replica node and inserting such changes into the new master node.

10. The computer readable media of claim 9 wherein the program code to negotiate to merge changes further comprises program code to flag conflicts in the merged changes.

11. An apparatus comprising:
- a processor and a computer readable medium comprising program code executable by the processor to cause the apparatus to,
- in response to detection of a communication failure between the apparatus and a second apparatus,
  - when the apparatus is operating as a replica node to the second apparatus that is operating as a master node, apply data received from the second apparatus while the second apparatus was operating as the master node and prior to the communication failure,
  - take a snapshot after applying the received data,
  - change the apparatus to operate as a master node after taking the snapshot, and
  - change the apparatus from an online replication mode to a periodic replication mode that causes the apparatus to store a data change range instead of storing changed data;
- serve user requests received while in the periodic replication mode;
- in response to detection of recovery from the communication failure between the apparatus and the second apparatus, negotiate with the second apparatus to merge changes resulting from both the apparatus and the second apparatus serving user requests while both operating as a master node; and
- revert the apparatus to an online replication mode.

12. The apparatus of claim 11 wherein the program code to change the apparatus to the periodic replication mode comprises program code to set a period of the periodic replication mode to infinite.

13. The apparatus of claim 11 wherein the program code to negotiate to merge changes comprises the program code to:
- determine which apparatus had the most changes from serving user requests during the communication failure;
- select the apparatus as a new master node based on a determination that the apparatus had the most changes;
- select the apparatus as a new replica node based on a determination that the apparatus had fewer changes; and
- merge changes in data from the new replica node into the new master node.

14. The apparatus of claim 13 wherein the program code to negotiate to merge changes further comprises program code to query changes made by the new replica node and insert such changes into the new master node.

15. The apparatus of claim 14 wherein the program code to negotiate to merge changes further comprises program code to flag conflicts in the merged changes.

* * * * *